United States Patent
Iino et al.

(10) Patent No.: US 9,381,790 B2
(45) Date of Patent: Jul. 5, 2016

(54) AIR CONDITIONING DEVICE FOR VEHICLE

(71) Applicant: Nissan Motor Co., Ltd., Yokohama-shi, Kanagawa (JP)

(72) Inventors: Kenji Iino, Isehara (JP); Masahiro Oonishi, Kamakura (JP); Shinichi Matano, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/406,642

(22) PCT Filed: Jun. 11, 2013

(86) PCT No.: PCT/JP2013/066118
§ 371 (c)(1),
(2) Date: Dec. 9, 2014

(87) PCT Pub. No.: WO2014/010360
PCT Pub. Date: Jan. 16, 2014

(65) Prior Publication Data
US 2015/0122452 A1    May 7, 2015

(30) Foreign Application Priority Data
Jul. 9, 2012   (JP) ................. 2012-153494

(51) Int. Cl.
*B60H 1/26* (2006.01)
*B60H 1/32* (2006.01)
*B60H 1/00* (2006.01)

(52) U.S. Cl.
CPC .......... *B60H 1/3229* (2013.01); *B60H 1/00507* (2013.01); *B60H 1/3227* (2013.01)

(58) Field of Classification Search
CPC ....... B60H 1/00507; B60H 1/26; B60H 1/232
USPC .................................................. 165/41, 202
See application file for complete search history.

(56) References Cited

U.S. PATENT DOCUMENTS

| | | | | |
|---|---|---|---|---|
| 3,758,031 A | * | 9/1973 | Moran ................. | B60H 1/2209 123/142.5 R |
| 5,545,860 A | * | 8/1996 | Wilkes ............... | B60H 1/00507 181/255 |
| 2003/0140652 A1 | * | 7/2003 | Yamazaki ............ | B60H 1/3229 62/509 |
| 2004/0251632 A1 | * | 12/2004 | Brezina .............. | B60H 1/00507 277/313 |
| 2005/0016196 A1 | * | 1/2005 | Kadle ................ | B60H 1/00507 62/298 |
| 2009/0093208 A1 | * | 4/2009 | Yang ....................... | B60H 1/26 454/275 |

(Continued)

FOREIGN PATENT DOCUMENTS

| | | |
|---|---|---|
| CN | 1252364 A | 5/2000 |
| DE | 102006051383 A1 | 4/2008 |

(Continued)

*Primary Examiner* — Devon Russell
(74) *Attorney, Agent, or Firm* — Global IP Counselors, LLP

(57) ABSTRACT

An external heat exchanger and the accumulator tank are disposed in the circulation path of a heat medium. In the air conditioner for a vehicle, the external heat exchanger is disposed in a sideways position between member front ends of a pair of left and right side members, extending in the vehicle longitudinal direction, with the heat-exchanging surface facing forward in the vehicle. The accumulator tank is disposed in a front corner area that is formed in a position that is to the outside in the vehicle width direction from the member front end of one side member of the pair of left and right side members, and that is in front of a vehicle wheel house covering a front tire.

9 Claims, 8 Drawing Sheets

(56) References Cited

U.S. PATENT DOCUMENTS

2012/0007387 A1* 1/2012 Fujinuki .................. B60G 3/06
                                                                296/180.1
2012/0175081 A1* 7/2012 Katoh ................ B60H 1/00335
                                                                165/104.14

FOREIGN PATENT DOCUMENTS

| | | |
|---|---|---|
| DE | 102006035089 A1 | 2/2010 |
| JP | 10-300283 A | 11/1998 |
| JP | 2000-62448 A | 2/2000 |
| JP | 2007-145104 A | 6/2007 |
| JP | 2009-208667 A | 9/2009 |
| JP | 2009-220760 A | 10/2009 |
| JP | 2010-47088 A | 3/2010 |
| JP | 2010-52559 A | 3/2010 |
| JP | 2011-235722 A | 11/2011 |

* cited by examiner

IN THE CASE OF A COOLER

AIR CONDITIONING DEVICE FOR VEHICLE

CROSS-REFERENCE TO RELATED APPLICATIONS

This application is a U.S. National stage application of International Application No. PCT/JP2013/066118 filed, Jun. 11, 2013, which claims priority to Japanese Patent Application No. 2012-153494 filed in Japan on Jul. 9, 2012, the contents of each of which are hereby incorporated herein by reference.

BACKGROUND

1. Field of the Invention

The present invention relates to an air conditioner for a vehicle having an accumulator tank for performing gas-liquid separation of a heat medium in the circulation path of the heat medium.

2. Background Information

Generally, an accumulator tank of an air conditioner for a vehicle that is used for cooling is disposed in a lateral position of a condenser that dissipates heat by condensing a heat medium that is discharged from a compressor. In contrast, an air conditioner for electric automobiles in which an accumulator tank is supported by and fixed to a side frame via a rubber tubular container and a bracket is known (refer to, for example, Japanese Laid-Open Patent Application No. 1998-300283).

SUMMARY

In the prior art in which the accumulator tank is disposed in the lateral position of the condenser, the temperature of the surrounding environment increases temperature due to heat dissipation from the condenser; therefore, the accumulator is susceptible to heat damage. Japanese Laid-Open Patent Application No. 1998-300283 discloses a concept in which an accumulator tank is fixed to a side frame; however, the positional relationship between the condenser and the accumulator tank is unclear, and the problem described above in which the accumulator tank is susceptible to heat damage is not fully solved.

In view of the problem described above, an objective of the present invention is to provide an air conditioner for a vehicle that is capable of protecting the accumulator tank from heat damage while suppressing heat loss by shortening the connection path between an external heat exchanger and an accumulator tank.

In order to achieve the objective described above, the premise of the present invention is an air conditioner for a vehicle with an external heat exchanger and an accumulator tank disposed in the circulation path of a heat medium.

In an air conditioner for a vehicle, the external heat exchanger is disposed sideways inside a vehicle between front ends of a pair of left and right side members extending in the vehicle longitudinal direction, with the heat-exchanging surface facing forward in the vehicle.

The accumulator tank is disposed in a front corner area that is formed in a position to the outside in the vehicle width direction from the front end of one of the pair of left and right side members and that is in front of a vehicle wheel house covering a tire.

As described above, the external heat exchanger and the accumulator tank are disposed in positions near each other, for example, sandwiching a the front end of the side member 109, in an inside position and an outside position in the vehicle width direction. The connection path of a heat medium that connects the external heat exchanger and the accumulator tank thereby is shorter, suppressing heat loss.

The accumulator tank that is disposed in the front corner area is disposed separately from the external heat exchanger by the side member and is disposed separate from the front tire by the wheel house. Therefore, the side member and the wheel house become heat barrier walls that suppress the effect of heat from the external heat exchanger and the front tire, thereby protecting the accumulator tank from heat damage.

By configuring the arrangement of the accumulator tank with an attention to a space that is present near the external heat exchanger while having a side member and a wheel house as heat barrier walls in this manner, protecting the accumulator tank from heat damage while suppressing heat loss is possible by shortening the connection path between the external heat exchanger and the accumulator tank.

BRIEF DESCRIPTION OF THE DRAWINGS

Referring now to the attached drawings which form a part of this original disclosure.

DETAILED DESCRIPTION OF EMBODIMENTS

Figure 1:
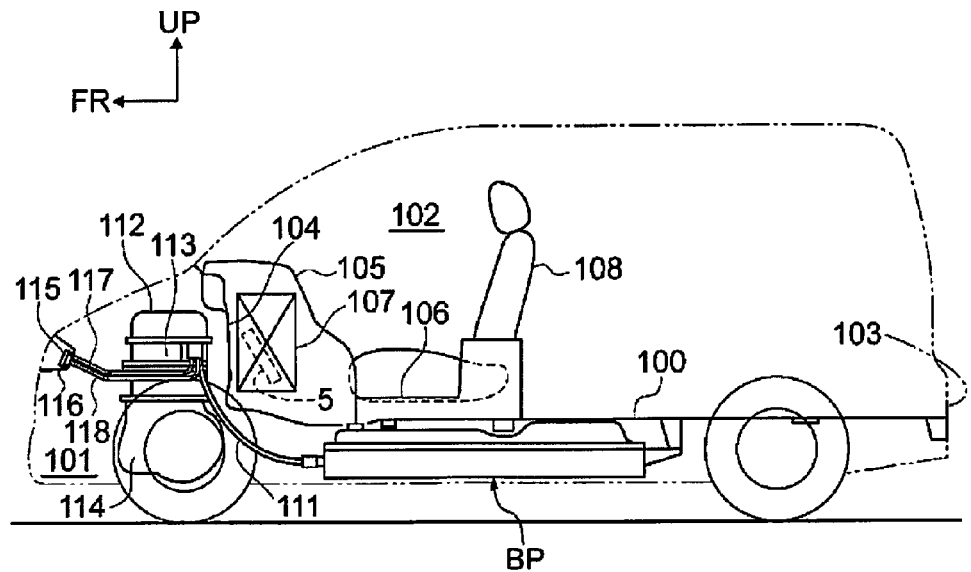
FIG. 1 is a side view illustrating a schematic overview of a minivan-type electric automobile that is equipped with an air conditioner for a vehicle according to a first embodiment.

The preferred embodiments for realizing the air conditioner for a vehicle according to the present invention are explained below based on the first embodiment illustrated in the drawings.

Embodiment 1

The configuration is described first.

The "vehicle schematic configuration of the air conditioner for a vehicle," the "circulation cycle configuration of the air conditioner for a vehicle," and the "detailed arrangement of the configuration of the accumulator tank" will be separately described regarding the configuration of the first embodiment in the air conditioner for a vehicle.

Vehicle Schematic Configuration of the Air conditioner for a Vehicle

Figure 2:
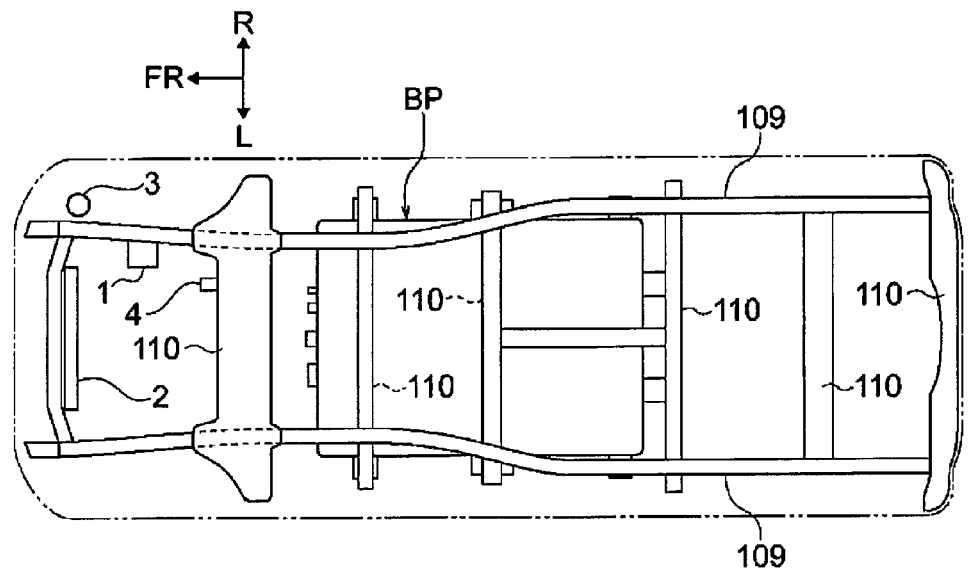
FIG. 2 is a plan view illustrating a schematic overview of a minivan-type electric automobile that is equipped with the air conditioner for a vehicle according to the first embodiment.

FIG. 1 and FIG. 2 illustrate a schematic configuration of a minivan-type electric automobile that is equipped with the air conditioner for a vehicle according to the first embodiment. The vehicle schematic configuration of the air conditioner for a vehicle will be described below based on FIG. 1 and FIG. 2.

In an electric automobile that is equipped with the air conditioner for a vehicle according to the first embodiment, a battery pack BP is disposed in the central position of the wheel base below a vehicle body floor 100, as illustrated in FIG. 1. The vehicle body floor 100 is disposed in a position that connects with a dash panel 104, which defines a motor room 101 and a cabin 102, to the position of a vehicle rear end surface 103, which is secured as the cabin 102, and has a flat shape with reduced floor surface irregularities from the front of the vehicle to the rear of the vehicle. The cabin 102 comprises an instrument panel 105, a center console box 106, an air conditioning unit 107, and a passenger seat 108. The battery pack BP is supported by the vehicle body member at eight points, as illustrated in FIG. 2. The vehicle body member is configured to comprise a pair of left and right side members 109, 109 that extend in the vehicle longitudinal direction and a plurality of cross members 110 that connect the pair of left and right side members 109, 109 in the vehicle width direction.

The battery pack BP is connected to a power electric module 112 (a DC/DC converter+charger) that is disposed in the motor room 101 via a charging/discharging harness 111 that is linearly routed in the vehicle longitudinal direction along the dash panel 104, as illustrated in FIG. 1. In addition to the power electric module 112, the motor room 101 comprises an inverter 113 and a motor drive unit 114 (a driving motor+a deceleration gear+a differential gear). A quick charge port 115 and a normal charge port 116 with a charge port lid are disposed in the vehicle front surface position. The quick charge port 115 and the power electric module 112 are connected by a quick charge harness 117. The normal charge port 116 and the power electric module 112 are connected by a normal charge harness 118.

The air conditioner for a vehicle according to the first embodiment is an air conditioner that serves as both a cooler and a heat pump and that includes a compressor 1, an external heat exchanger 2, an accumulator tank 3, an expansion valve 4 (an expansion mechanism), and an in-cabin heat exchanger 5. Schematic vehicle positions in which these components are disposed are described below.

The compressor 1 is disposed in a position inside of the motor room 101 and in a sideways position between the pair of left and right side members 109, 109 that extend in the vehicle longitudinal direction, as illustrated in FIG. 2.

The external heat exchanger 2 is disposed in a position inside of the motor room 101 and in a sideways position between the front ends of the pair of left and right side members 109, 109 extending in the vehicle longitudinal direction, with the heat-exchanging surface facing forward in the vehicle, as illustrated in FIG. 2.

The accumulator tank 3 is disposed in a position inside of the motor room 101 and in a position that is to the outside in the vehicle width direction from the front end of one side members 109 of the pair of left and right side members 109, 109 that extends in the vehicle longitudinal direction, as illustrated in FIG. 2. The detailed arrangement of the configuration of the accumulator tank 3 will be described below.

The expansion valve 4 is disposed in a position that is on the motor room 101 side of the dash panel 104 and that is near the air conditioning unit 107, sandwiching the dash panel 104, as illustrated in FIG. 2

The in-cabin heat exchanger 5 is installed in an air conditioning unit 107 that is disposed in a position that is inside of an instrument panel 105 on the cabin 102 side from the motor room 101 separated by the dash panel 104, as illustrated in FIG. 1.

Circulation Cycle Configuration of the Air Conditioner for a Vehicle

Figure 3:
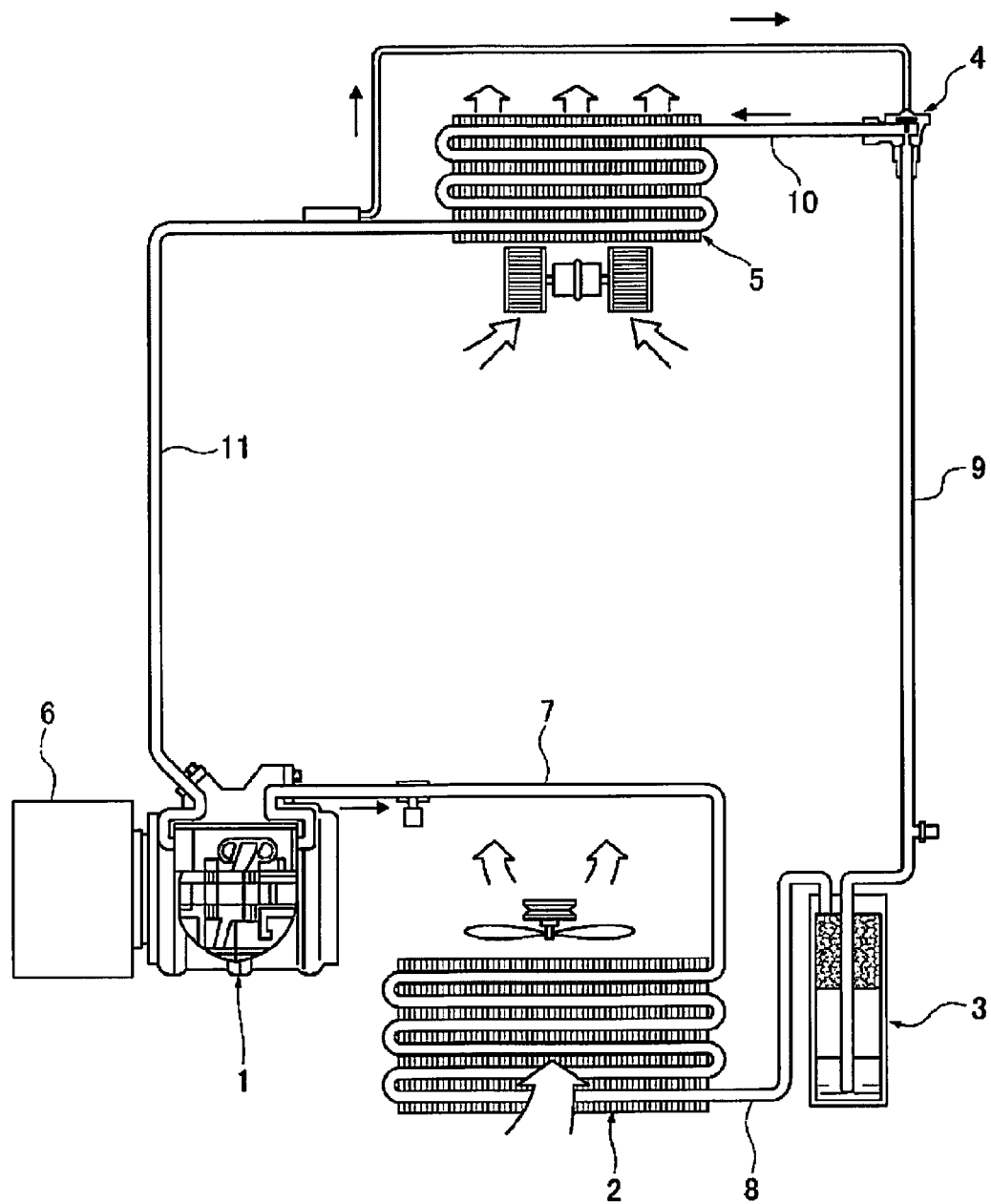
FIG. 3 is a circulation cycle block view illustrating each component present in the air conditioner for a vehicle according to the first embodiment.

FIG. 3 is a circulation cycle block view illustrating each component present in the air conditioner for a vehicle of the first embodiment. The circulation cycle configuration of the air conditioner for a vehicle will be described below based on FIG. 3.

The air conditioner for a vehicle according to the first embodiment is provided with a compressor 1, an external heat exchanger 2, an accumulator tank 3, an expansion valve 4 (an expansion mechanism), and an in-cabin heat exchanger 5 in the circulation path of a heat medium, as illustrated in FIG. 3. The function of each component when using the air conditioner for a vehicle for cooling will be described below.

The compressor is an electric compressor with a motor 6 as the drive source that compresses a low-temperature/low-pressure gas medium that is sent from the in-cabin heat exchanger 5 to make a high-temperature/high-pressure gas medium, which is sent to a circulation path 7.

The external heat exchanger 2 dissipates heat by condensing the high-temperature/high-pressure gas medium that has been discharged from a compressor 1 to make a gas-liquid mixed medium, which is sent to a circulation path 8. In other words, the external heat exchanger 2 functions as a condenser.

The accumulator tank 3 separates the normal temperature/high-pressure gas-liquid mixed medium that has been sent from the external heat exchanger 2 into a gas medium and a liquid medium and sends the separated liquid medium to the expansion valve 4 via a circulation path 9.

The expansion valve 4 expands the normal temperature/high-pressure liquid medium from the accumulator tank 3 to make a low-temperature/low-pressure liquid medium, which is sent to the in-cabin heat exchanger 5 via a circulation path 10. The expansion valve 4 conducts valve control by feeding back the heat medium temperature on the outlet side of the in-cabin heat exchanger 5. In addition to the expansion valve 4, a capillary tube for controlling the decompression and flow rate by passing a thin tube through the liquid medium can be used as the expansion mechanism.

The in-cabin heat exchanger 5 absorbs heat by evaporating the low-temperature/low-pressure liquid medium from the expansion valve 4 to make a low-temperature/low-pressure gas medium, which is sent to a circulation path 11. In other words, the in-cabin heat exchanger 5 functions as an evaporator.

Since the heat pump is for utilizing the heat that has been dissipated by the condenser for heating, the air conditioner for a vehicle can be used as a heat pump for heating by switching the circuit configuration of the circulation cycle, such as by making the external heat exchanger 2 the evaporator and by making the in-cabin heat exchanger 5 the condenser.

Detailed Arrangement of the Configuration of the Accumulator Tank

FIG. 4 to FIG. 9 are views illustrating the accumulator tank and the configuration of the periphery of the tank present in the air conditioner for a vehicle according to the first embodiment. The detailed arrangement of the configuration of the accumulator tank will be described below based on FIG. 4 to FIG. 9.

The vehicle body configuration according to the arrangement of the accumulator tank 3 includes a side member 109, a lower extension additional member 12, a forward extension additional member 13, a suspension member 14, a bumper stay 15, a front end module 16, and a wheel house 17, as illustrated in FIG. 4 to FIG. 7.

Figure 4:
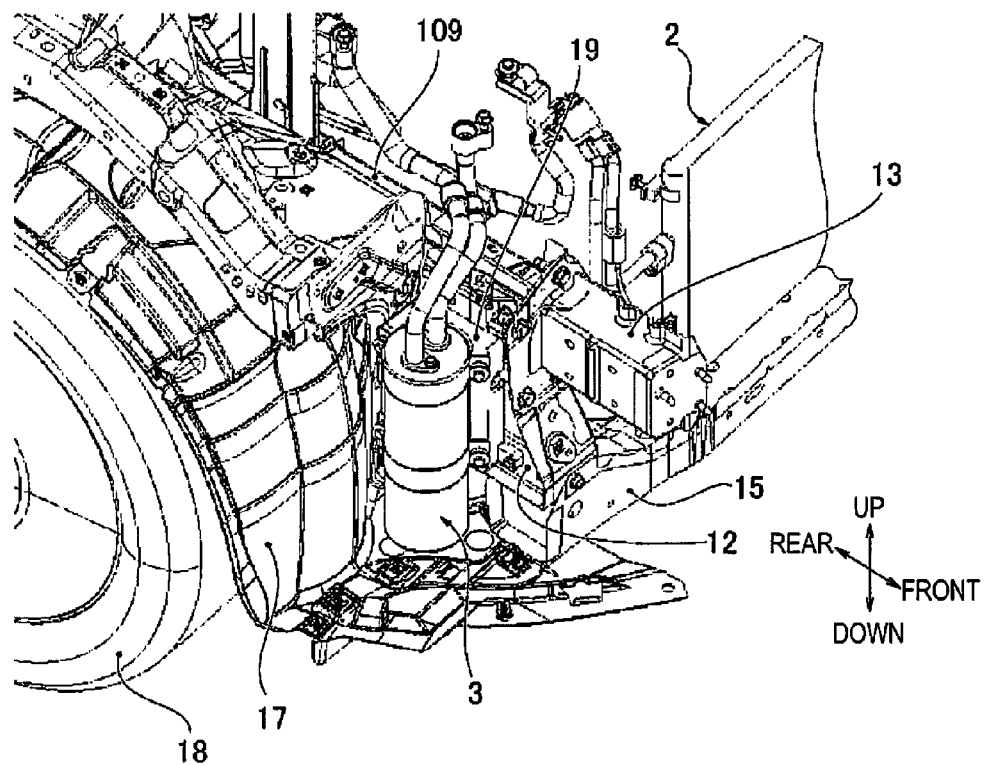
FIG. 4 is a perspective view illustrating the arrangement of the configuration of the external heat exchanger and the accumulator tank in the air conditioner for a vehicle according to the first embodiment.
Figure 5:
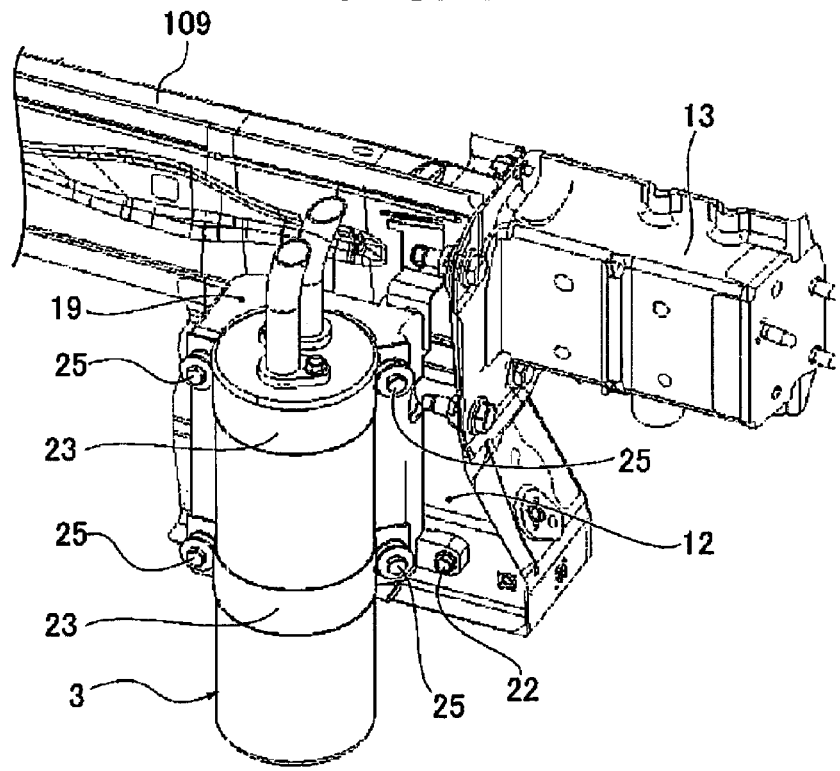
FIG. 5 is an enlarged perspective view illustrating the arrangement of the configuration of the accumulator tank in the air conditioner for a vehicle according to the first embodiment.

The lower extension additional member 12 that extends below the vehicle on the lower surface of the front end is fixed to the side member 109, and the forward extension additional member 13 that extends forward in the vehicle is integrally fixed to the front end, as illustrated in FIG. 4 and FIG. 5.

Figure 7:
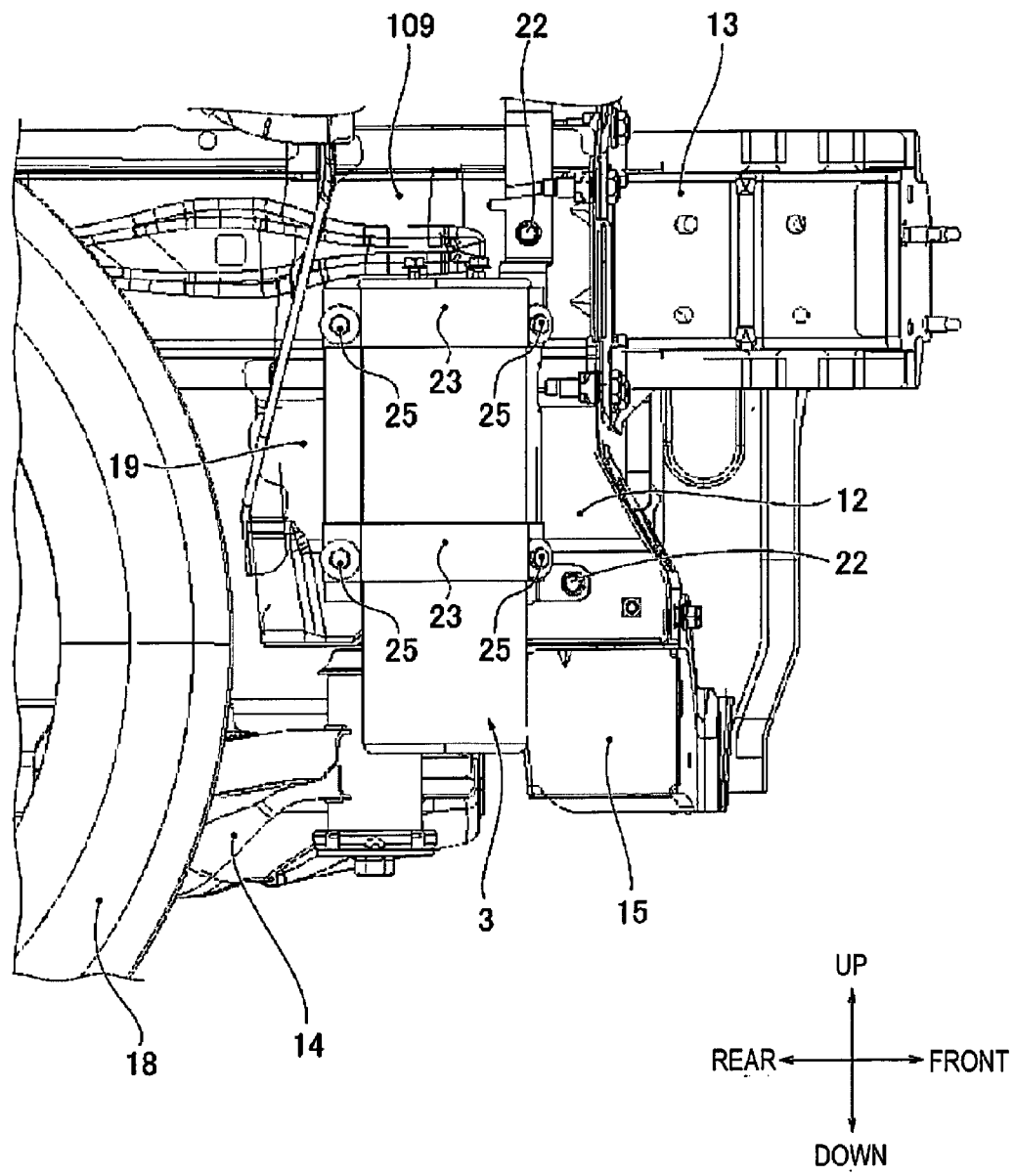
FIG. 7 is a side view illustrating the arrangement of the configuration of the accumulator tank in the air conditioner for a vehicle according to the first embodiment.

The suspension member 14 is elastically supported by the lower end of the lower extension additional member 12, as illustrated in FIG. 7. This suspension member 14 is a trapezoidal member that elastically supports a link member of a front wheel suspension device.

The bumper stay 15 includes both ends fixed to a pair of left and right lower extension additional members 12, 12 and bridges the lower extension additional members 12, 12 in the vehicle width direction, as illustrated in FIG. 4 and FIG. 7.

The front end module 16 modularizes a plurality of configurations present in the front portion of the vehicle, such as the front bumper, the head lights, and the like, and is fixed to a pair of left and right forward extension additional members 13, 13 and the bumper stay 15, as illustrated in FIG. 16.

Figure 9:
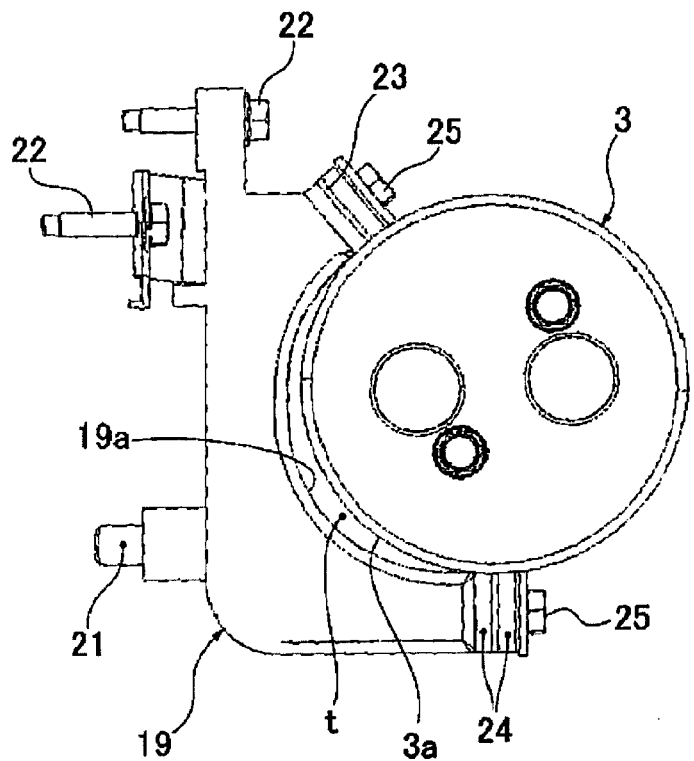
FIG. 9 is a plan view illustrating the accumulator tank and the resin bracket in the air conditioner for a vehicle according to the first embodiment.

The wheel house 17 is a member that covers a front tire 18 and that is fixed to the side member 109, as illustrated in FIGS. 4 and 9.

The configuration according to the arrangement of the accumulator tank 3 includes an external heat exchanger 2, a resin bracket 19, and a washer tank 20, as illustrated in FIG. 4 and FIG. 9.

The external heat exchanger 2 is disposed in a sideways position between front ends of a pair of left and right side members 109, 109 extending in the vehicle longitudinal direction, with the heat-exchanging surface facing forward in the vehicle, as illustrated in FIG. 4.

Figure 6:
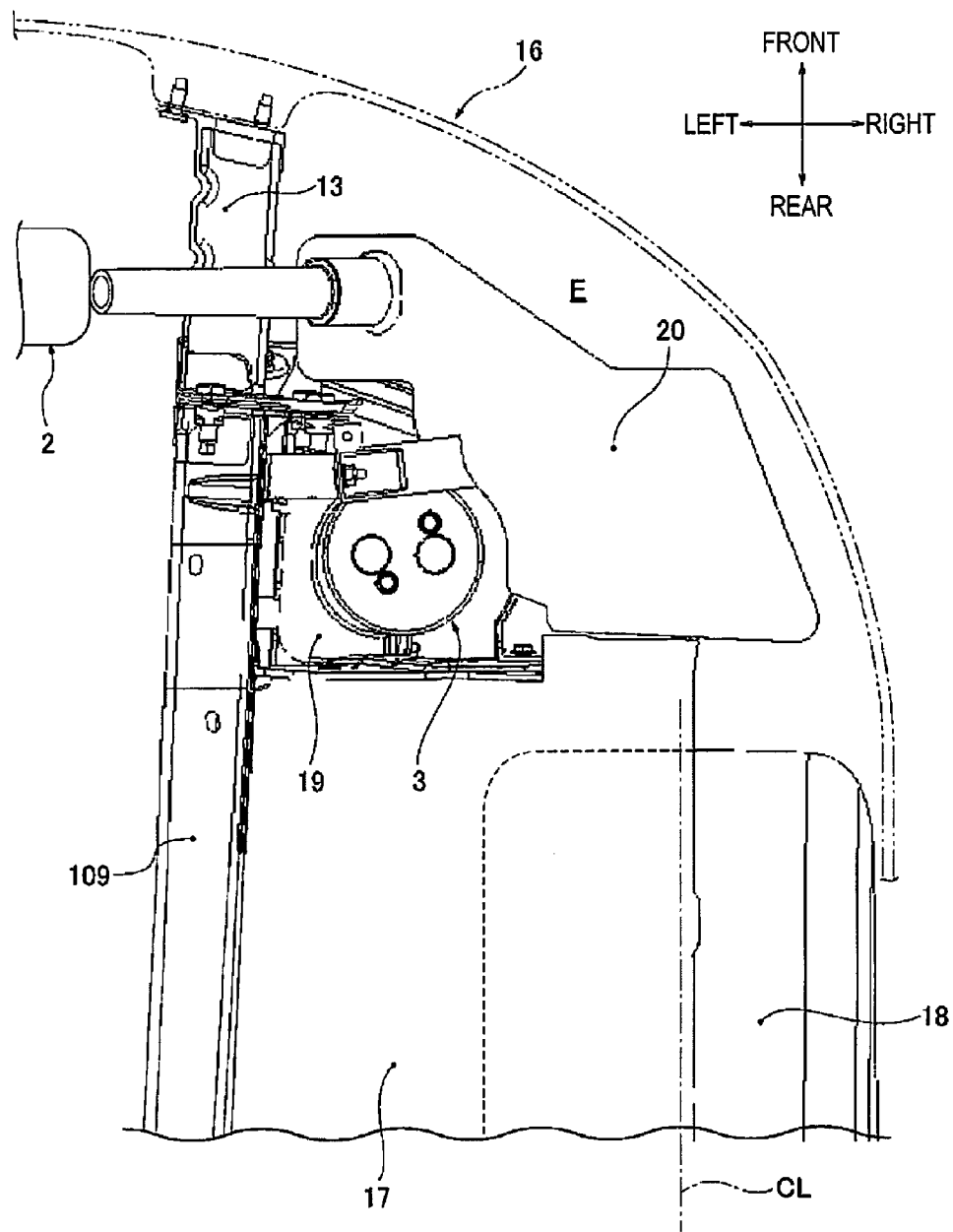
FIG. 6 is a plan view illustrating the arrangement of the configuration of the accumulator tank and a washer tank in the air conditioner for a vehicle according to the first embodiment.

The accumulator tank 3 is disposed in a front corner area E that is formed in a position that is to the outside in the vehicle width direction from the front end of the right side member 109 of the pair of left and right side members 109, 109 and that is in front of the vehicle wheel house 17 covering the front tire 18, as illustrated in FIG. 4 and FIG. 6. The accumulator tank 3 is disposed in a position that is inside in the vehicle width direction of the position of a tire center axis CL of the front tire 18, which is set in the wheel house 17, as illustrated in FIG. 6. The accumulator tank 3 is disposed in a position that is rearward in the vehicle of the bumper stay 15, which is provided bridging the front ends of the pair of left and right side members 109, 109 (the lower extension additional members 12, 12) in the vehicle width direction, as illustrated in FIG. 4 and FIG. 7. In addition, the accumulator tank 3 is disposed in a position that is to the outside of the lower extension additional member 12 in the vehicle width direction, as illustrated in FIG. 5. The width of the vehicle longitudinal direction of the lower extension additional member 12 is a width that is sufficiently wider than the outer diameter of the cylindrical accumulator tank 3, as illustrated in FIG. 5.

Figure 8A:
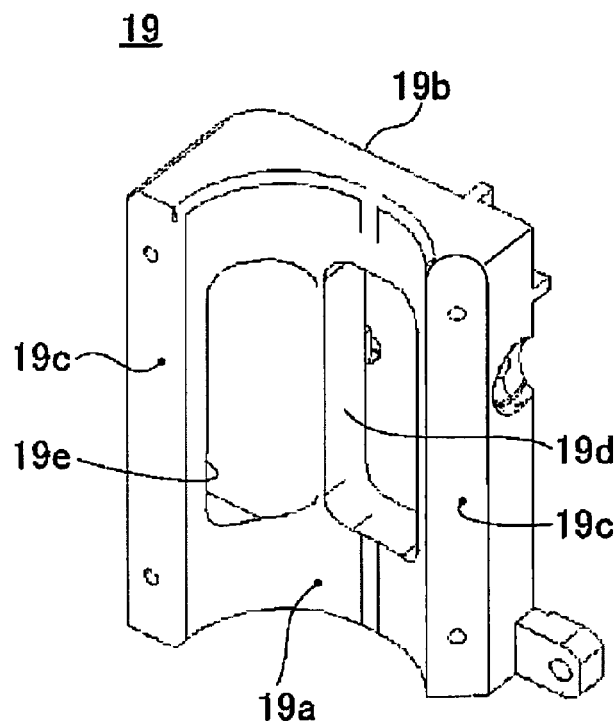
FIG. 8A is a perspective view illustrating a resin bracket of the accumulator tank in the air conditioner for a vehicle according to the first embodiment as seen from a tank holding surface.
Figure 8B:
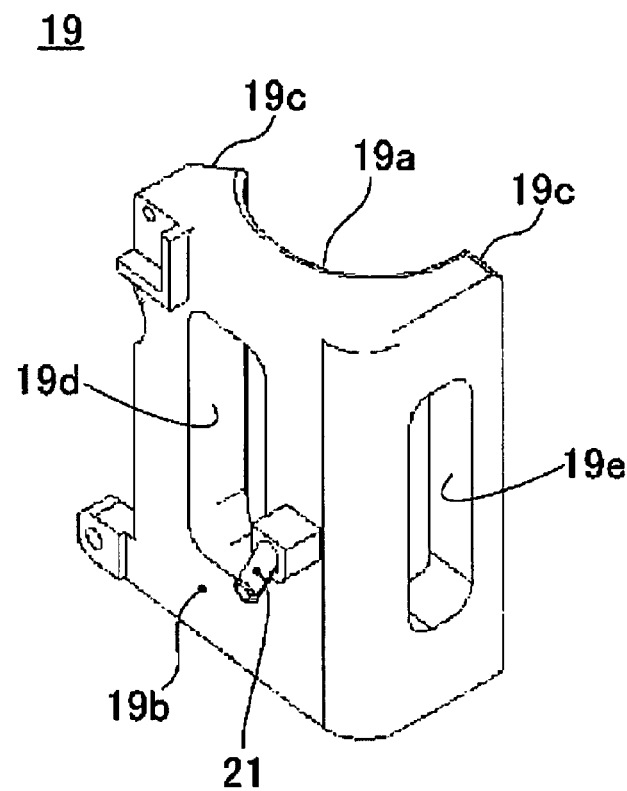
FIG. 8B is a perspective view illustrating the resin bracket of the accumulator tank in the air conditioner for a vehicle according to the first embodiment as seen from a tank fixing surface.

The resin bracket 19 is configured by a resin molded article that is used as a fixing bracket for the accumulator tank 3. This resin bracket 19 comprises a tank holding surface 19a that holds the tank cylinder surface of the accumulator tank 3, a member fixing surface 19b that is fixed to the side member 109 and the lower extension additional member 12, and a tank fixing surface 19c that fixes the accumulator tank 3 to the resin bracket 19, as illustrated in FIG. 8A and FIG. 8B. The resin bracket 19 forms openings 19d, 19e in the portions that face the side member 109 and the wheel house 17, as illustrated in FIG. 8A and FIG. 8B.

The tank holding surface 19a is configured to be a partial holding surface that holds only a portion of the tank cylinder surface 3a (around ⅓ of the peripheral surface) of the tank cylinder surface 3a (the entire peripheral surface of the tank) of the accumulator tank 3 that faces the side member 109 and the wheel house 17, as illustrated in FIG. 9. The tank holding surface 19a and the tank cylinder surface 3a of the accumulator tank 3 are put in a state in which both ends are in contact with an intermediate gap t by making the arc surface radius of the tank holding surface 19a shorter than the cylinder radius of the accumulator tank 3.

The member fixing surface 19b is a surface for tightly fixing the resin bracket 19 to the side member 109 and the lower extension additional member 12, as illustrated in FIG. 9. In other words, the resin bracket 19 is configured to be positioned and fixed using a positioning pin 21 that is embedded and fixed in the resin bracket 19 and two bolts 22.

The tank fixing surface 19c is a surface for fixing the accumulator tank 3 to the resin bracket 19 in an elastically supportive state, as illustrated in FIG. 9. In other words, the accumulator tank 3 is fixed in an elastically supportive state using two bands 23, elastic washers 24 that sandwich both bent ends of the band 23 from both surfaces, and four bolts 25, as illustrated in FIG. 5 and FIG. 9.

The openings 19d, 19e are disposed so as to increase the elastic deformation ability of the resin bracket 19 and to suppress an increase in the ambient temperature by promoting the circulation of air, as illustrated in FIG. 8A and FIG. 8B.

The washer tank 20 is disposed in a space outside of the tank that is formed along an exposed cylinder surface of the tank, excluding the partial holding surface of the front corner area E in which is disposed the accumulator tank 3, as illustrated in FIG. 6. That is, the front corner area E is formed surrounded by the side member 109, the wheel house 17, and the front end module 16. By disposing the accumulator tank 3 in an area within the front corner area E, in which the side member 109 and the wheel house 17 intersect, the outside area of the accumulator tank remains a spare space, so that a washer tank 20 for storing window washer fluid can be disposed utilizing this space. The washer tank 20 is fixed to the side member 109 and the wheel house 17.

Next, the effects are described.

The "cabin interior cooling effect and cabin interior heating effect," the "heat damage protection effect of the accumulator tank," and the "resin bracket supporting effect of the accumulator tank" will be separately described regarding their effects on the air conditioner for a vehicle of the first embodiment.

Cabin Interior Cooling Effect and the Cabin Interior Heating Effect

The air conditioner for a vehicle according to the first embodiment is an air conditioner that serves as both a cooler and a heat pump. The cabin interior cooling effect and the cabin interior heating effect will be described based on FIG. 10 and FIG. 11.

Heat absorption by an evaporator is utilized when using the air conditioner for a vehicle as a cooler for cooling.

Figure 10:
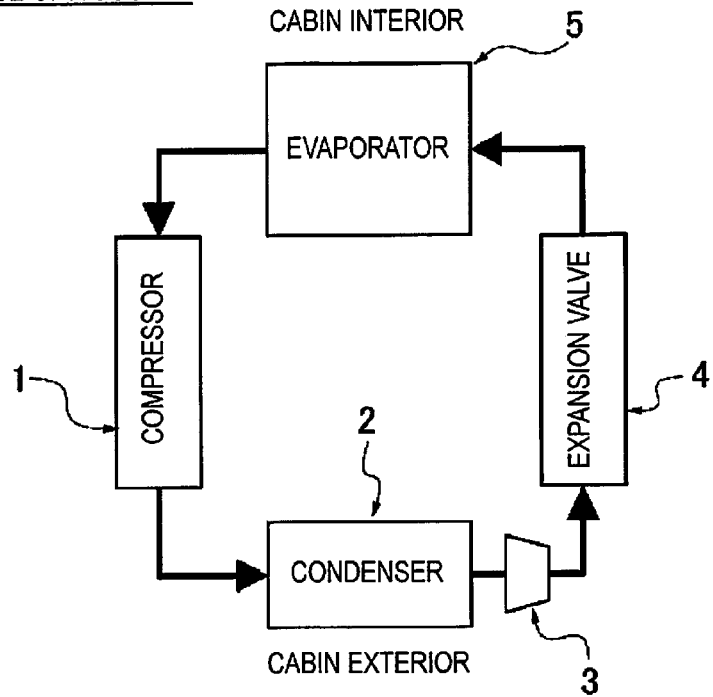
FIG. 10 is an operation explanatory view illustrating the cabin interior cooling effect when the air conditioner for a vehicle according to the first embodiment is used as a cooler.

In other words, the low-temperature/low-pressure gas medium sent from the in-cabin heat exchanger 5 is compressed in the compressor 1 to make a high-temperature/high-pressure gas medium, as illustrated in FIG. 10. In the subsequent external heat exchanger 2, heat is dissipated by condensing the high-temperature/high-pressure gas medium discharged from the condenser 1 to make a normal temperature/high-pressure gas-liquid mixed medium. In the accumulator tank 3, the normal temperature/high-pressure gas-liquid mixed medium that has been sent from the external heat exchanger 2 is separated into a gas medium and a liquid medium. In the subsequent expansion valve 4, the normal temperature/high-pressure liquid medium from the accumulator tank 3 is expanded to make a low-temperature/low-pressure liquid medium. In the in-cabin heat exchanger 5, heat is absorbed by evaporating the low-temperature/low-pressure liquid medium from the expansion valve 4.

Therefore, the in-cabin heat exchanger 5 functions as an evaporator that removes heat from the air inside of the cabin and that performs cooling by reducing the cabin interior temperature.

The heat that is dissipated by the condenser is used for heating when using the air conditioner for a vehicle as a heat pump for heating.

Figure 11:
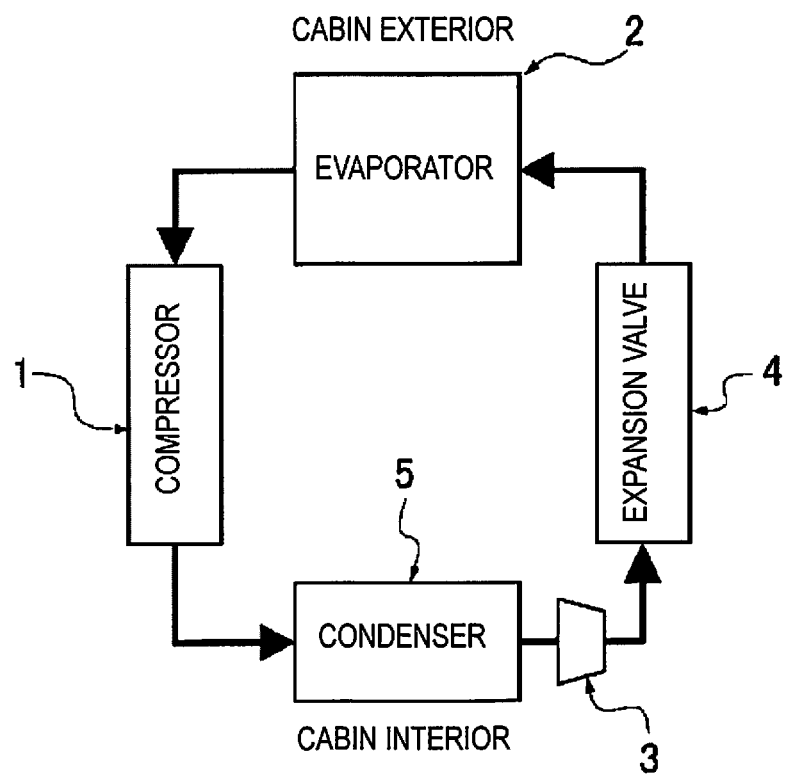
FIG. 11 is an operation explanatory view illustrating the cabin interior heating effect when the air conditioner for a vehicle according to the first embodiment is used as a heat pump.

In other words, the normal temperature/high-pressure gas-liquid mixed medium that has been sent from the in-cabin heat exchanger 5 is separated into a gas medium and a liquid medium in the accumulator tank 3, as illustrated in FIG. 11. In the expansion valve 4, the normal temperature/high-pressure liquid medium from the accumulator tank 3 is expanded to make a low-temperature/low-pressure liquid medium. In the external heat exchanger 2, heat is absorbed by evaporating the low-temperature/low-pressure liquid medium from the expansion valve 4. The external heat exchanger 2 is referred to as a "heat pump" when pumping heat into the air. In the compressor 1, the gas medium with an increased temperature and pressure that has been sent from the external heat exchanger 2 is compressed to make a high-temperature/high-pressure gas medium. In the s in-cabin heat exchanger 5, heat is dissipated by condensing the high-temperature/high-pressure gas medium that has been discharged from the compressor 1.

Therefore, the in-cabin heat exchanger 5 functions as a condenser that provides heat to the air inside of the cabin and that performs heating by raising the cabin interior temperature.

Heat Damage Protection Effect of the Accumulator Tank

The accumulator tank 3 exhibits a function to separate gas-liquid medium of the heat medium; when subjected to thermal influence, the gas-liquid separation function is reduced, and the heat medium becomes readily gasified. Therefore, in order to cause the accumulator tank to exhibit a stable gas-liquid separation function, protecting the accumulator tank 3 from heat damage is necessary. The heat damage protection effect of the accumulator tank 3 that reflects the above will be described below.

For example, a Comparative Example shall be one in which the accumulator tank is fixed to the sideways position of the side member and in which the external heat exchanger and the accumulator tank are disposed sideways inside the area between a pair of left and right side members.

In the case of this Comparative Example, if the external heat exchanger and the accumulator tank are disposed adjacently, the connection path of the heat medium becomes short, and heat loss can be suppressed; however, the accumulator tank will be susceptible to heat damage from the external heat exchanger.

On the other hand, if the external heat exchanger and the accumulator tank are disposed away from each other, the accumulator will be protected from heat damage from the external heat exchanger; however, the connection path of the heat medium becomes long, and heat loss increases. Depending on the setting position of the accumulator tank, the accumulator tank will become susceptible to heat damage from other heat sources (such as a power unit or the like) present sideways inside the area between the pair of left and right side members.

In contrast, in the first embodiment, the external heat exchanger 2 is disposed in a sideways position between front ends of the pair of left and right side members 109, 109 extending in the vehicle longitudinal direction, with the heat-exchanging surface facing forward in the vehicle. A configuration is also used in which the accumulator tank 3 is disposed in a front corner area E that is formed in a position that is to the outside in the vehicle width direction from the front end of one side member 109 of the pair of left and right side members 109, 109 and that is in front of a vehicle wheel house 17 covering a front tire 18.

As described above, the external heat exchanger 2 and the accumulator tank 3 are disposed in positions near each other, for example, sandwiching a front end of the side member 109 in the inside position and the outside position in the vehicle width direction. The connection path (circulation path 8) of the heat medium that connects the external heat exchanger 2 and the accumulator tank 3 thereby becomes shorter, suppressing heat loss.

The accumulator tank 3 that is disposed in the front corner area E is disposed separate from the external heat exchanger 2 by the side member 109 and is disposed separate from the front tire 18 by the wheel house 17. Therefore, the side member 109 and the wheel house 17 become heat barrier walls that suppress the effect of heat from the external heat exchanger 2 and the front tire 18, thereby protecting the accumulator tank 3 from heat damage.

The arrangement of the accumulator tank 3 is configured in this manner, paying attention to a front corner area E, which is a space that is present near the external heat exchanger 2 but that has the side member 109 and the wheel house 17 as heat barrier walls. Therefore, the accumulator tank 3 is protected from heat damage while suppressing heat loss by shortening the connection path between the external heat exchanger 2 and the accumulator tank 3.

In the first embodiment, a configuration was used in which the accumulator tank 3 is disposed in a position that is inside in the vehicle width direction of the position of a tire center axis CL of the front tire 18, which is set in the wheel house 17.

Therefore, by disposing the accumulator tank 3 as in the case in which the accumulator tank 3 is disposed in a position that is inside in the vehicle width direction of the position of a tire center axis CL, preventing an increase in the vehicle body dimension in the vehicle width direction is possible. Additionally, the distance from the front tire 18, which becomes high-temperature, to the accumulator tank 3 can be maximally secured while driving. Accordingly, the accumulator tank 3 will be placed in a thermal environment that is less susceptible to heat damage from the front tire 18, and the accumulator tank 3 is further protected from heat damage.

In the first embodiment, a configuration was used in which the accumulator tank 3 is disposed in a position that is rearward in the vehicle of the bumper stay 15 that is provided bridging the front ends of the pair of left and right side members 109, 109 in the vehicle width direction.

Therefore, when a front collision occurs, the impact force is received by the bumper stay 15, thereby mitigating the deformation and the like caused by impacting the bumper stay 15. Accordingly, inhibiting the impact mitigating effect of the bumper stay 15 can be prevented due to the placement of the accumulator tank 3.

In the first embodiment, a configuration was used in which the accumulator tank 3 is disposed in a position that is to the outside of the lower extension additional member 12 in the vehicle width direction.

Therefore, the lower extension additional member 12 is added alongside the side member 109 as heat barrier walls that suppress the thermal effect of the external heat exchanger 2, so that the heat from the external heat exchanger 2 is not directly transmitted to the accumulator tank 3. Accordingly, the accumulator tank 3 will be placed in a thermal environment that is less susceptible to heat damage from the external heat exchanger 2, and the accumulator tank 3 is further protected from heat damage.

Resin Bracket Supporting Effect of the Accumulator Tank

Vibration input can impact the front end of the side member 109, to which is fixed the accumulator tank 3, which will cause a fluctuation in the fluid level of the liquid medium while driving. Therefore, configuring the fixing and supporting mechanisms to suppress the vibration input as much as possible is necessary. The resin bracket supporting effect of the accumulator tank 3 that reflects the above will be described below.

In the first embodiment, a configuration is used in which a resin bracket 19 configured by a resin molded article is a fixing bracket for the accumulator tank 3, and the accumulator tank 3 is fixed to and supported by the side member 109 via the resin bracket 19.

Therefore, when vibration is input from the front end of the side member 109 toward the accumulator tank 3 while driving, the vibration input is attenuated by the resin bracket 19 that has a high vibration absorbing capacity, thereby suppressing a fluctuation in the fluid level of the liquid medium in the accumulator tank 3. Accordingly, the gas-liquid separation function of the accumulator tank 3 is secured against the input of vibration while driving; for example, air suction can be suppressed even if there is vibration input so that the liquid medium can be separated.

In the first embodiment, a configuration was used in which the tank holding surface 19a present in the resin bracket 19 is configured to be a partial holding surface that holds only a portion of the tank cylinder surface 3a that faces the side member 109 and the wheel house 17. The configuration thereby becomes one in which the accumulator tank 3 is disposed in, of the front corner area E, the area in which the side member 109 and the wheel house 17 intersect. Consequently, of the front corner area E, the outside area of the accumulator tank 3 remains a spare space.

In the first embodiment, a configuration is used in which the washer tank 20 is disposed in a space outside of the tank that is formed along an exposed cylinder surface of the tank, excluding the partial holding surface of the front corner area E in which the accumulator tank 3 is disposed.

Therefore, when disposing the accumulator tank 3, the washer tank 20 is disposed utilizing the space outside of the tank that remains a spare space, and the washer tank 20 will not be a heat source to the accumulator tank 3. Accordingly, the space in the front corner area E can be effectively used without deteriorating the thermal environment of the accumulator tank 3.

Next, the effects are described.

The effects listed below can be obtained with the air conditioner for a vehicle according to the first embodiment.

(1) In an air conditioner for a vehicle with an external heat exchanger 2 and an accumulator tank 3 provided in the circulation path of a heat medium, the external heat exchanger 2 is disposed in a sideways position between front ends of the pair of left and right side members 109, 109 extending in the vehicle longitudinal direction, with the heat-exchanging surface facing forward in the vehicle, and the accumulator tank 3 is disposed in a front corner area E that is formed in a position that is to the outside in the vehicle width direction from the front end of one side member 109 of the pair of left and right side members 109, 109 and that is in front of a vehicle wheel house 17 covering a front tire 18.

The arrangement of the accumulator tank 3 is configured in this manner, paying attention to a space that is present near the external heat exchanger 2 but that has the side member 109 and the wheel house 17 as heat barrier walls. Therefore, the accumulator tank 3 is protected from heat damage while suppressing heat loss by shortening the connection path between the external heat exchanger 2 and the accumulator tank 3.

(2) The accumulator tank 3 is disposed in a position that is inside in the vehicle width direction of the position of a tire center axis CL of the front tire 18, which is set in the wheel house 17.

A configuration is used in which the distance from the accumulator tank 3 to the front tire 18, which becomes high-temperature while driving, can be maximally secured; therefore, in addition to the effect of (1), the accumulator tank 3 is further protected from heat damage from the front tire 18.

(3) The accumulator tank 3 is disposed in a position that is rearward in the vehicle of the bumper stay 15, which is disposed so as to bridge the front ends of the pair of left and right side members 109, 109 in the vehicle width direction.

Therefore, a configuration is used in which the impact force in a front collision is received by the bumper stay 15 before being received by the accumulator tank 3; therefore, in addition to the effects of (1) or (2), inhibiting the impact mitigating effect of the bumper stay 15 can be prevented due to the placement of the accumulator tank 3.

(4) The side member 109 includes a lower extension additional member 12 that extends below the vehicle and that connects with the suspension member 14, and disposes the accumulator tank 3 in a position that is to the outside of the lower extension additional member 12 in the vehicle width direction.

Therefore, a configuration is used in which the lower extension additional member 12 is added as a heat barrier wall that suppresses the thermal effect of the external heat exchanger 2; therefore, in addition to the effects of (1) to (3), the accumulator tank 3 can be further protected from heat damage from the external heat exchanger 2.

(5) A resin bracket 19 configured by a resin molded article is disposed as a fixing bracket for the accumulator tank 3, and the accumulator tank 3 is fixed to and supported by the side member 109 via the resin bracket 19.

Therefore, a configuration is used in which the accumulator tank 3 is elastically supported via a resin bracket 19 that has a high vibration absorbing capacity; as a result, in addition to the effects of (1) to (4), securing the gas-liquid separation function of the accumulator tank 3 against the input of vibration while driving becomes possible.

(6) The resin bracket 19 comprises a tank holding surface 19a that holds the tank cylinder surface 3a of the accumulator tank 3 and a member fixing surface 19b that is fixed to the side member 109, and the tank holding surface 19a is configured to be a partial holding surface that holds, of the tank cylinder surface 3a, only a portion of the tank cylinder surface 3a that faces the side member 109 and the wheel house 17.

Therefore, a configuration is used in which the accumulator tank 3 is disposed in an area in which the side member 109 and the wheel house 17 intersect; as a result, in addition to the effects of (5), of the front corner area E, the outside area of the accumulator tank 3 remains a spare space.

(7) A washer tank for storing window washer fluid is provided, and the washer tank 20 is disposed in a space outside of the tank that is formed along an exposed cylinder surface of the tank, excluding the partial holding surface of the front corner area E in which the accumulator tank 3 is disposed.

Therefore, a configuration is used in which the accumulator tank 3 and the washer tank 20 are disposed in the front corner area E; as a result, in addition to the effects of (6), the space in the front corner area E can be effectively used without deteriorating the thermal environment of the accumulator tank 3.

The air conditioner for a vehicle of the present invention was described above based on the first embodiment, but the specific configurations thereof are not limited to the first embodiment; various modifications and additions to the design can be made without departing from the scope of the invention according to each claim in the Claims.

In the first embodiment, an example is described in which the air conditioner for a vehicle is used as an air conditioner that serves as both a cooler and a heat pump. However, the air conditioner for a vehicle can also be used as only a cooler or as only a heat pump.

In the first embodiment, an example is described in which the battery pack temperature control structure of the present invention is applied to a minivan-type electric automobile to which a driving motor is mounted as the only drive source. However, the air conditioner for a vehicle of the present invention can, of course, also be applied to, in addition to a minivan-type vehicle, various wagon-type, sedan-type, and SUV type electric automobiles. Additionally, the present invention can be applied to hybrid vehicles equipped with a driving motor and an engine as the drive source and to vehicles equipped with an engine as a drive source. In short, the present invention can be applied to any vehicle equipped with an air conditioner for a vehicle, in which an external heat exchanger and an accumulator tank that conducts gas-liquid separation of a heat medium are provided in the circulation path of the heat medium.

The invention claimed is:

1. An air conditioning device for a vehicle, comprising:
an external heat exchanger disposed in a circulation path of a heat medium and arranged between front ends of a pair of left and right side members of a body of the vehicle, the left and right side members extending in a vehicle longitudinal direction and being separated from each other in a vehicle widthwise direction, a heat-exchanging surface of the external heat exchanger facing forward in the vehicle longitudinal direction; and
an accumulator tank disposed in the circulation path of the heat medium and arranged in a front corner area of the vehicle in front of a vehicle wheel house covering a front tire of the vehicle, the entire accumulator tank being positioned outward in a vehicle width direction from the front end of one of the pair of left and right side members and inward in the vehicle width direction of a tire center axis of the front tire when the front tire is straight such that the tire center axis extends in the vehicle longitudinal direction, the tire center axis corresponding to a widthwise center position of the front tire.

2. The air conditioning device for a vehicle according to claim 1, wherein
the accumulator tank is disposed in a position that is rearward in the vehicle longitudinal direction of a bumper stay, the bumper stay bridging the front ends of the pair of left and right side members in the vehicle width direction.

3. The air conditioning device for a vehicle according to claim 1, wherein
at least one of the side members includes a lower extension additional member extending below the vehicle and connecting with a suspension member, and
the accumulator tank is disposed in a position to an outside of the lower extension additional member in the vehicle width direction.

4. The air conditioning device for a vehicle according to claim 1, further comprising
a resin bracket made of molded resin that is provided as a fixing bracket for the accumulator tank,
the accumulator tank being fixed to and supported by the side member via the resin bracket.

5. The air conditioning device for a vehicle according to claim 4, wherein
the resin bracket comprises a tank holding surface holding a tank cylinder surface of the accumulator tank and a member fixing surface fixed to the side member, and
the tank holding surface is a partial holding surface holding only a portion of the tank cylinder surface that faces the side member and the wheel house.

6. The air conditioning device for a vehicle according to claim 2, wherein
at least one of the side members includes a lower extension additional member extending below the vehicle and connecting with a suspension member, and
the accumulator tank is disposed in a position to the outside of the lower extension additional member in the vehicle width direction.

7. The air conditioning device for a vehicle according to claim 2, further comprising
a resin bracket made of molded resin that is provided as a fixing bracket for the accumulator tank,
the accumulator tank being fixed to and supported by the side member via the resin bracket.

8. The air conditioning device for a vehicle according to claim 3, further comprising
a resin bracket made of molded resin that is provided as a fixing bracket for the accumulator tank,
the accumulator tank being fixed to and supported by the side member via the resin bracket.

9. An air conditioning device for a vehicle, comprising:
an external heat exchanger disposed in a circulation path of a heat medium and arranged between front ends of a pair of left and right side members of a body of the vehicle, the left and right side members extending in a vehicle longitudinal direction and being separated from each other in a vehicle widthwise direction, a heat-exchanging surface of the external heat exchanger facing forward in the vehicle longitudinal direction;

an accumulator tank disposed in the circulation path of the heat medium and arranged in a front corner area of the vehicle in front of a vehicle wheel house covering a front tire of the vehicle, the entire accumulator tank being positioned outward in a vehicle width direction from the front end of one of the pair of left and right side members and inward in the vehicle width direction of a tire center axis of the front tire when the front tire is straight such that the tire center axis extends in the vehicle longitudinal direction, the tire center axis corresponding to a widthwise center position of the front tire;

a resin bracket made of molded resin that is provided as a fixing bracket that supports accumulator tank and fixes the accumulator tank to the one of the left and right side members, the resin bracket including a tank holding surface that holds a tank cylinder surface of the accumulator tank and a member fixing surface that is fixed to the one of the left and right side members, the tank cylinder surface of the accumulator tank facing the one of the left and right side members and the wheel house, the tank holding surface of the resin bracket being a partial holding surface holding only a portion of the tank cylinder surface; and a washer tank configured to store window washer fluid, the washer tank being disposed in the front corner area in which the accumulator tank is disposed, the washing tank being positioned on a vehicle widthwise outward side of the accumulator tank along an exposed cylinder surface of the accumulator tank.

* * * * *